…

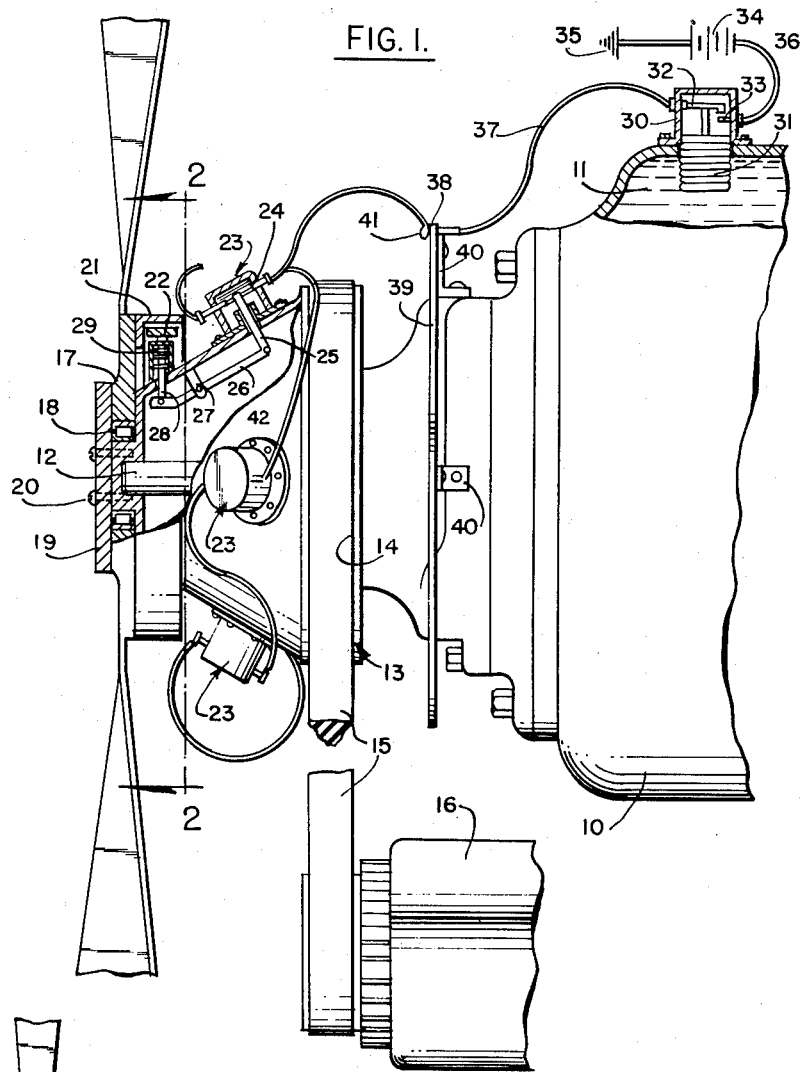

United States Patent Office 2,723,738
Patented Nov. 15, 1955

2,723,738

THERMOSTATICALLY CONTROLLED ELECTRO-MAGNETICALLY OPERATED CLUTCH

Victor J. Pesek, Westmont, Ill.

Application June 10, 1953, Serial No. 360,776

2 Claims. (Cl. 192—84)

This invention relates to a thermostat controlled engine cooling fan.

It is an object of the invention to provide a thermostat control for an engine cooling fan to allow the engine to warm up faster in cold weather by allowing the fan to stand still and remain inoperative until such time as the engine is sufficiently warm and at that time causing the fan to be engaged with the drive pulley automatically to thereupon supply cooling air to the engine when needed.

It is another object of the invention to provide a control for an engine fan for cooling which is mounted for free rotation on the fan belt pulley and wherein magnetically operated means is provided on the pulley to engage with a clutch band on the fan to couple the pulley with the fan to cause the same to be driven and a thermal or thermostat means responsive to the temperature of the cooling water of the engine to establish a circuit for effecting the actuation of the engaging elements with the clutch drum of the fan.

Other objects of the invention are to provide a thermostat controlled engine fan, which is of simple construction, inexpensive to manufacture, has a minimum number of parts, compact, durable and adapted to have a tight grip upon the fan, easy to install, and efficient in operation.

For a better understanding of the invention reference may be had to the following detailed description taken in connection with the accompanying drawing, in which Figure 1 is a fragmentary side elevational view of an engine and pulley assembly mounted thereon and showing the thermostat control mechanism for causing the engagement of the fan with the pulley;

Fig. 2 is a fragmentary vertical sectional view taken on line 2—2 of Fig. 1.

Referring now to the figures, 10 represents an internal combustion engine having a water cooling chamber 11 with water therein. An engine shaft 12 extends outwardly from the engine and on this shaft may be mounted a fan and fan pulley assembly 13. The fan pulley is hollow and of conical shape and is fixed at its end to the shaft 12 upon the end of the shaft and has a pulley groove 14 in which a pulley belt 15 runs. This pulley belt is connected to a generator 16.

A fan 17 is connected to the end of the fan pulley by roller bearings 18 and can run free of the pulley at times when cooling air is not needed as in cold weather and when the engine is first being warmed up. An end plate 19 is secured by screw 20 to the pulley 13 to hold the fan 17 against axial displacement therefrom.

The fan 17 has a clutch drum 21 with which a plurality of engaging elements 22 may engage.

These engaging elements 22 form a part of a magnetically operated mechanism 23 for setting the engaging elements 22. There are four of these magnetic devices 23 and each comprises a solenoid 24 that acts upon a rod 25 to pivot a lever 26 about a fulcrum 27 for engagement with the end of a shank 28 of engaging element 22. Surrounding the shank 28 is a coil compression spring 29 that normally urges the inward movement of the engaging element 22 away from the band 21. The spring pressure is overcome by the magnet 24 when it is energized.

On the engine 10 and extending into the cooling water chamber is a thermostat 30 having a bellows 31 adapted to expand so as to cause a movable contact 32 to engage with a fixed contact 33 and thereby establish a circuit from a battery 34 grounded at 35. A cable 36 extends from the battery to the contact 33. A cable 37 extends from the movable contact 32 to a contact ring 38 that is insulatingly connected to the engine 10. This annular contact is shown at 39 and is fixed to the engine by brackets 40.

A contact 41 extends from one of the devices 23 and will slide over the face of the ring contact 39 to pick up electric current for the operation of the magnetic devices 23. The devices 23 are interconnected with one another about the pulley 13 by cables 42. These magnetically operated devices are grounded to establish the electric current circuit through them in the usual manner.

In operation, the fan 17 will be normally left free on the pulley 13. The pulley will be operated by the engine by virtue of its engagement with the engine shaft 12 so as to run the generator 16 at the beginning of the operation of the engine 10. As the engine warms up the cooling water will cause the bellows 31 of the thermostat to expand so that contact is established between the movable contact 32 and the stationary contact 33 for the delivery of current to the contact ring 39. Current is taken off from the ring by movable contact 41 and delivered to the magnets 24 of the several magnetically operated devices 23 whereby to cause levers 26 to be tilted and the clutch engaging elements expanded against the action of their springs 29 for engagement with the clutch drum 21 of the fan 17. This locks the fan with the pulley 13. As the engine becomes cool, the energized devices will become deenergized by virtue of the bellows 31 contracting to disengage the contact 32 from the contact 33.

It will be apparent that while the operation is effected and controlled by the thermostat, some may also be controlled by manual means accessible to the operator in the vehicle. The clutch elements 22 as shown in Fig. 2 extend between two magnetically operated mechanisms so as to be operated by the joint effect of two such mechanisms.

While various changes may be made in the detailed constructions shown, it shall be understood that such changes will be within the spirit and scope of the present invention as defined by the appended claims.

What is claimed is:

1. A magnetically operated clutch comprising a shaft, a substantially frusto-conical shell fixed to the end of said shaft, a brake drum journalled upon said shell, magnetically operated devices circumferentially spaced and mounted on said shell, each of said magnetically operated devices including a solenoid, a lever fulcrumed on the inner side of said shell, a spring biased shank engaged by the lever, and clutch engaging elements engageable with the clutch drum upon the solenoid being energized, switch means connected in series with said magnetically operated devices, and a source of electromotive force for energizing said magnetically operated devices through said switch means.

2. A magnetically operated clutch according to claim 1, said switch means comprising an expandible bellows having a movable contact responsive to the expansive movement thereof, and to the contraction thereof and adapted to engage with a stationary contact upon being contracted, a contact ring surrounding said shaft adjacent to said shell, said contact ring being electrically connected to said movable contact, and a moving contact extending from one of said magnetically operated devices and engaging with said contact ring to slide thereover and to supply thereby current to the magnetically operated devices, said magnetically operated devices being interwired together, one terminal of said electromotive force being connected to said stationary contact, the other terminal of said electromotive force being grounded, one of said magnetically operated devices being grounded.

References Cited in the file of this patent

UNITED STATES PATENTS

| | | |
|---|---|---|
| 1,389,395 | Stuart | Aug. 30, 1921 |
| 1,900,586 | Rippe | Mar. 7, 1933 |
| 1,934,783 | Arterburn | Nov. 14, 1933 |
| 2,396,000 | Findley | Mar. 5, 1946 |